UNITED STATES PATENT OFFICE.

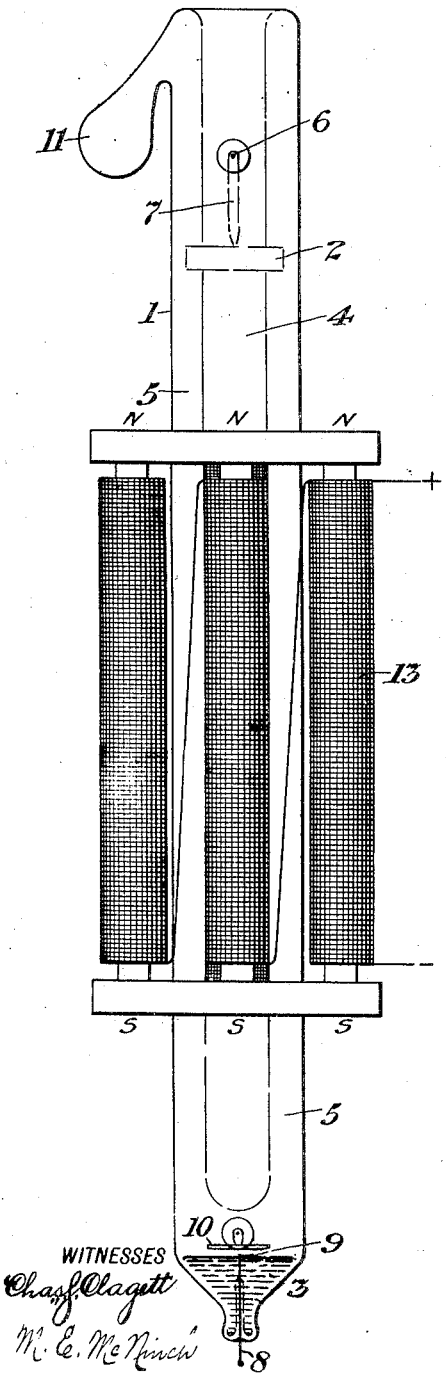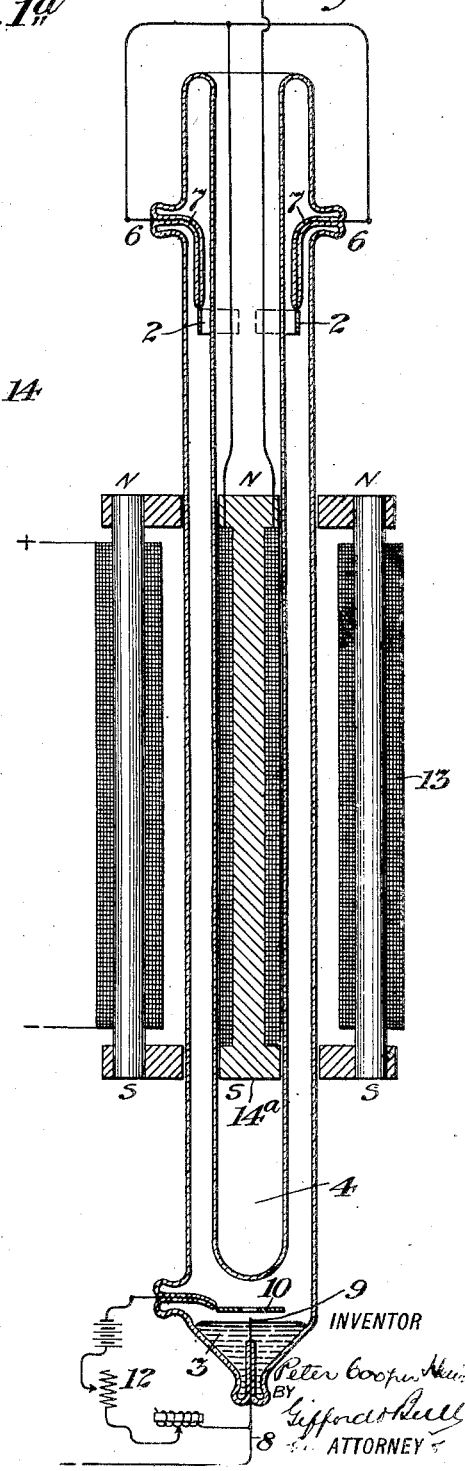

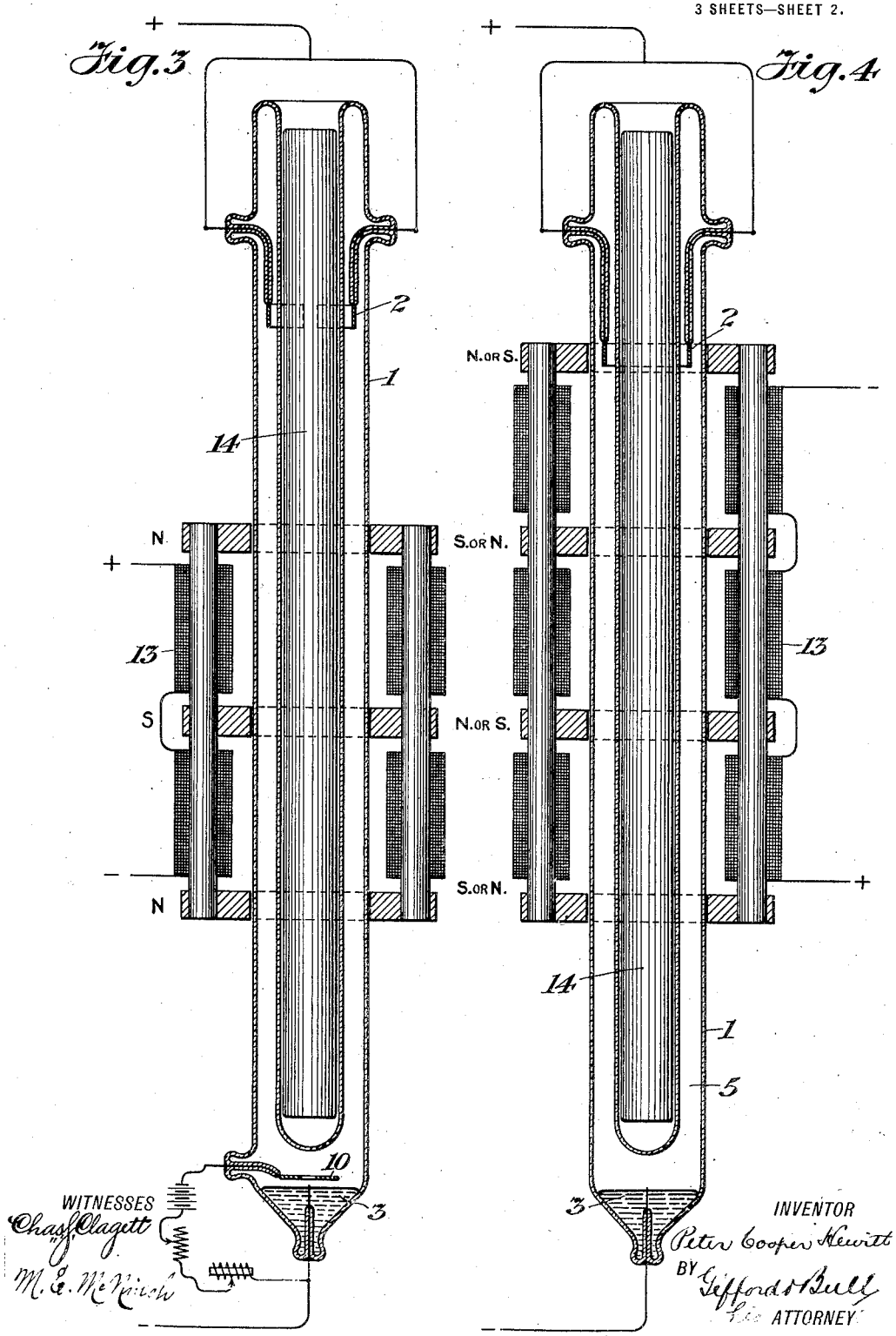

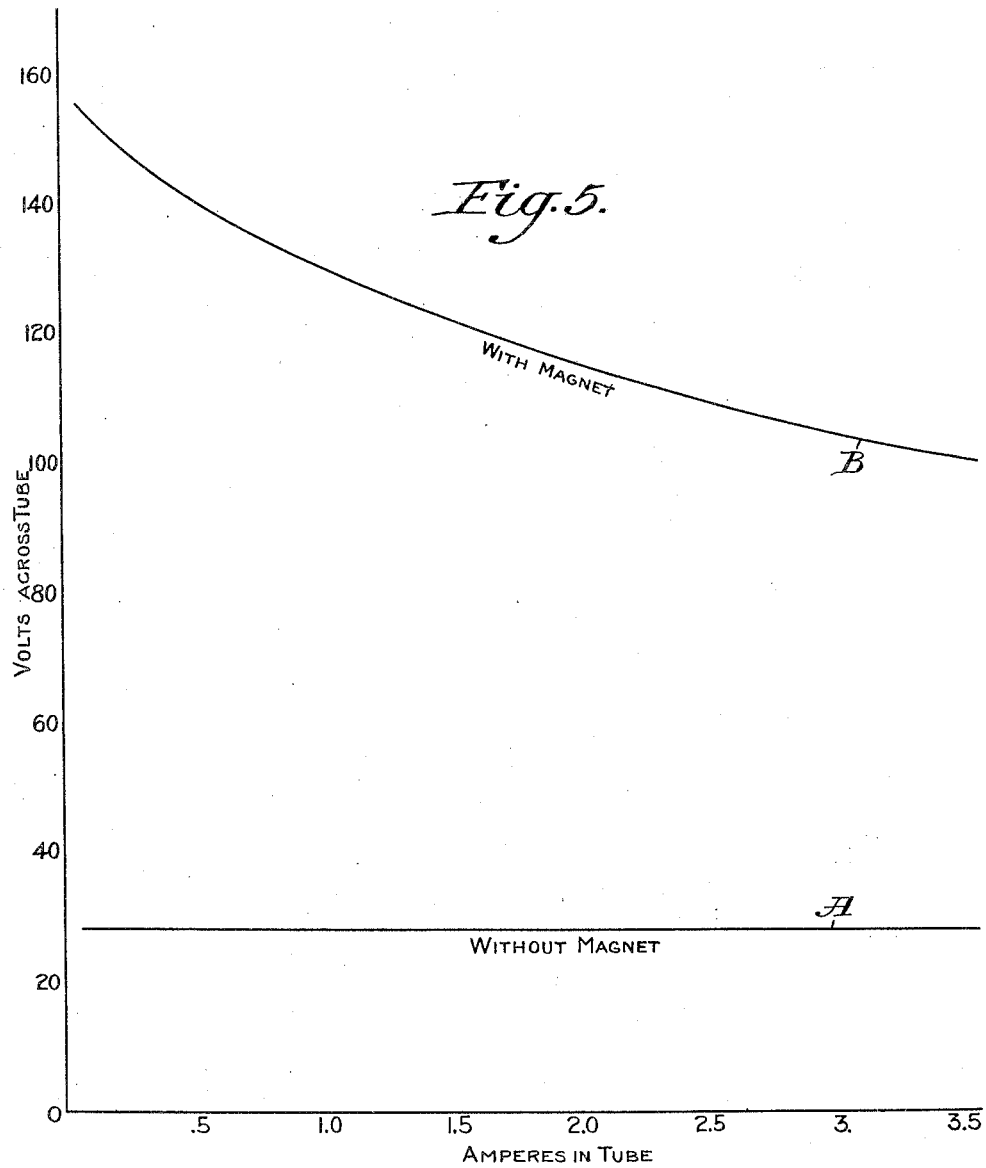

PETER COOPER HEWITT, OF RINGWOOD MANOR, NEW JERSEY.

METHOD OF AND MEANS FOR CREATING IN A PORTION OF AN ELECTRIC CIRCUIT A FALLING ELECTROMOTIVE-FORCE CHARACTERISTIC.

1,321,435.   Specification of Letters Patent.   Patented Nov. 11, 1919.

Application filed May 12, 1914. Serial No. 838,035.

*To all whom it may concern:*

Be it known that I, PETER COOPER HEWITT, a citizen of the United States, residing at Ringwood Manor, in the county of Passaic and State of New Jersey, have invented certain new and useful Improvements in Methods of and Means for Creating in a Portion of an Electric Circuit a Falling Electromotive-Force Characteristic, of which the following is a specification.

My present invention relates to methods of and means for creating in a portion of an electric circuit a predetermined falling electromotive force characteristic.

I have discovered that by subjecting the space between the electrodes of a gas or vapor tube such as the well-known Cooper Hewitt tube, when it is alive, or in conducting condition, or in what is sometimes called an "ionized" condition, and so constructed that for wide ranges of current it has an approximately constant electromotive force, to the influence of a proper magnetic field, the electromotive force required to pass a given current is increased and also at the same time the device is given a falling electromotive force characteristic whereby the electromotive force diminishes as the current increases. In other words, the electromotive force required to pass a given current tends to be increased by the magnetic influence and while the magnetic influence is maintained, if the current is made to vary, the electromotive force tends to be diminished by increments of current. If the tube is so constructed as to have a falling electromotive force characteristic without a magnet field imposed on its conducting path, then when a magnetic field is employed as set forth above, the electromotive force characteristic is made more falling. By properly adjusting and coördinating the tube and the magnetic field, I am able to obtain a regulated or predetermined electromotive force characteristic.

My present invention is useful wherever it is desired to create in a portion of a circuit a falling electromotive force characteristic.

I have also discovered that the effect of a magnetic field impressed on that part of an annular path between electrodes which constitutes the conducting path of a gas or vapor tube, as distinguished from the negative and positive electrode zones thereof, is increased by assisting the lines of force to cross said path, by locating the source of said lines both inside and outside said annular space, or by locating the source of said lines on one side and a good conductor of said lines on the opposite side of said annular space. This feature of my invention is applicable not only to regulators, but to other forms of gas or vapor tubes on which a magnetic field is impressed.

While I have shown herein only mercury vapor tubes, it will be understood that other gas, or vapor, or evacuated tubes may be employed.

In the accompanying drawings, Figure 1 represents a form of vapor tube adapted to the purposes of my invention.

Fig. 1ᵃ is a core which may be used in connection with the device shown in Fig. 1.

Fig. 2 is a section of a tube similar to Fig. 1, but at right angles thereto, and showing certain modifications.

Figs. 3 and 4 illustrate different forms and modifications of electromagnets and their use.

Fig. 5 is a curve sheet illustrating the effect of a magnetic field on devices of the type shown in the drawings.

Referring to Figs. 1 and 2, a vapor tube 1 is shown having a circular positive electrode 2 and a negative electrode 3 located at or near the opposite ends of the tube. The tube is made with a reëntrant cylindrical portion 4 extending nearly to the negative electrode. This results in forming an annular space 5. The positive electrode 2 surrounds, or nearly surrounds the reëntrant portion 4. Leading-in conductors 6 extend through proper seals 7 to the electrode 2. In like manner leading-in conductor 8 connects with the negative electrode 3. In practice in some cases I find it useful to extend a solid conductor 9 slightly above the surface of the negative electrode, as this serves to assist in steadying the current at the negative electrode. A perforated plate 10 forming a "keep-alive" positive is shown just above the negative electrode 3, which is included in a separate circuit 12 supplied from any suitable direct current source. A reservoir or pocket 11 may be provided for containing excess mercury for adjusting the level of the negative electrode.

An electromagnet 13 is shown having its poles directed across the vapor path. This may be a permanent magnet, or an electromagnet traversed by current from a separate source, or both. The arrangement of this magnet may be variously modified, the essential being that the lines of magnetic force are directed in or through a portion of a vapor path in a proper manner so as to affect the current flowing through the tube.

In order that this may be done I preferably so arrange the magnet or magnets that the field is distributed in as uniform manner as practicable across any cross section of the conducting path formed by the annular space of the tube.

In Fig. 1ª there is shown a supplemental iron core 14 which may be located within the reëntrant portion of the tube to assist in causing the magnetic lines of force to traverse the space 5, and serving to increase its action.

In Fig. 2 two electromagnets 13 and 14ª are shown. In this case the electromagnet 14ª is shown as connected in series with the tube and so wound that it tends to neutralize the effect of the lines of force produced by the magnet 13. The action in this case may be assumed to be as follows: By the field produced by the magnet 13, the electromotive force required to pass a given current is increased. But, as the current increases, the electromotive force is progressively decreased. By the use of a magnet 14ª in series with the tube, the effect of the current passed to progressively decrease the electromotive force is increased, inasmuch as it, in addition, acts to progressively neutralize the lines of force created by the magnet 13. Its tendency, therefore, is to increase the falling electromotive force characteristic, the limit being reached when the field due to magnet 13 is completely neutralized by the field of magnet 14ª. In this case the separately-excited magnet may be one which is uniformly excited and, therefore, has a constant field, or it may be variable excited, and has, therefore, a varying field.

In Fig. 3 there is shown an external electromagnet 13 in which the poles of one sense are at the extremities (in this case the north poles) and the poles of the opposite sense are intermediate.

In Fig. 4 there are four sets of poles shown, the external ones being north at the top and south at the bottom (or vice versa) and the intermediate ones being alternating. Differences are observable between the actions of the north and the south poles placed near the electrodes of the device, which are serviceable under certain conditions.

The tubes as shown here, without the magnetic field, have an approximately constant voltage for wide ranges of current. By imposing a magnetic field, as shown, the voltage across the tube is increased for any given current within the range, and the tube will then have a falling electromotive-force characteristic: that is, for the lower values of current the electromotive force across the tube will be higher than for higher values of current. This is shown in Fig. 5 wherein curve A represents the voltage-current relation of a tube as shown in Fig. 1, for instance, when no magnetic field is applied, and curve B represents the voltage-current relation of the same tube with a magnetic field imposed on the path between the electrodes.

The magnetic field may be produced by a permanent magnet, or by a separately-excited magnet, or by a magnet connected in shunt, or in series, or compound wound. Instead of a magnet with an iron core, a simple coil of wire traversed by a current may be employed to produce the desired magnet field. Instead of employing a magnet energized by direct current, an alternating current may be utilized through a magnet or otherwise. Indeed, any suitable means of producing such field may be employed.

The term "gas or vapor tube" as used herein is intended to include all forms of devices which are the equivalent of a mercury tube for the purposes of this invention, irrespective of the contents of the tube, and irrespective of the means employed to keep the negative electrode alive, or to keep the resistance to starting at the negative electrode at a low value. The term, therefore, as used may include, for example, a tube exhausted to any degree, or a suitable current flow in air or other gas, and may include a device in which the negative electrode is kept constantly alive, or in which the resistance to starting at the negative electrode is maintained at a low value, by being highly heated; and may include any path between electrodes controlled mechanically or electrically, where the resistance to starting at the negative electrode is maintained at a low value.

By the use of the term "annular" herein as descriptive of the form of construction of the gas or vapor tube, I do not confine myself to a construction wherein the tube conducting space is ring-shaped in cross-section, but employ said term in a generic sense to include any form of tube constructed with inner and outer tubular walls spaced from each other to form the conducting space between the electrode zones, whether said space be ring-shaped or of other continuous form in cross section.

An important feature incident with the use of an annular container, or its equivalent, is that such a construction prevents axial current concentration in the path between the electrodes of the device during the operation of the system.

I claim as my invention:

1. The method of creating in a gas or vapor device a predetermined falling electromotive force characteristic, which consists in subjecting the conducting path between the electrodes thereof to the action of distributed and regulated lines of magnetic force, varying the field inversely to the current variations and preventing axial current concentration.

2. The method of creating in part of a circuit including a gas or vapor tube, a falling electromotive force characteristic, which consists in causing the current to flow through an annular path, subjecting such path to the action of a magnetic field, varying the field inversely to the current variations.

3. The method of creating a falling electromotive force characteristic in a circuit including a gas or vapor tube annular in form in the direction of the current path, which consists in raising the voltage required to pass current by imposing a magnetic field on said annular space, and varying the field inversely to the current variations.

4. The method of creating in a circuit including a gas or vapor tube, a regulated falling electromotive force characteristic, which consists in raising the voltage required to pass current by magnetic lines of force acting on said space, and by causing the current passed to annul the action of said magnetic field in some proportion thereto.

5. The combination with a gas or vapor tube, of an excited magnet acting upon the conducting path between the electrodes of said tube, and means for neutralizing in some proportion the field of said magnet.

6. The combination with a gas or vapor tube, of an excited magnet, the field of which is of constant value, presented to the conducting path between the electrodes of said tube, and windings in series with the tube, the field of the magnet windings opposing the field created by said uniformly excited magnet.

7. A gas or vapor device comprising a suitable container and positive and negative electrodes, a portion of the space between the electrodes containing the conducting vapor column being annular and parallel with the current path, and means located outside said annular portion for creating a magnetic field therein and separately excited means located within the annular portion for creating a magnetic field.

8. In combination, a circuit, a gas or vapor tube included in said circuit, said tube being annular in the direction of the conducting path, and means for subjecting said annular space to the action of opposing radial magnetic fields.

In testimony whereof I have hereunto signed my name in the presence of two subscribing witnesses.

PETER COOPER HEWITT.

Witnesses:
L. A. COLEMAN,
R. A. HEWITT.